US012613078B2

(12) United States Patent
Olson et al.

(10) Patent No.: US 12,613,078 B2
(45) Date of Patent: Apr. 28, 2026

(54) IMAGING APPARATUS WITH THERMAL AUGMENTATION

(71) Applicant: Syntec Optics, Rochester, NY (US)

(72) Inventors: James Olson, Saline, MI (US); Alok Kapoor, Weston, MA (US)

(73) Assignee: Syntec Optics, Rochester, NY (US)

( * ) Notice: Subject to any disclaimer, the term of this patent is extended or adjusted under 35 U.S.C. 154(b) by 297 days.

(21) Appl. No.: 18/581,544

(22) Filed: Feb. 20, 2024

(65) Prior Publication Data

US 2024/0295382 A1 Sep. 5, 2024

Related U.S. Application Data

(60) Provisional application No. 63/449,362, filed on Mar. 2, 2023.

(51) Int. Cl.
| | |
|---|---|
| *F41G 1/34* | (2006.01) |
| *F41G 1/38* | (2006.01) |
| *G02B 23/10* | (2006.01) |
| *G02B 27/30* | (2006.01) |
| *H04N 23/11* | (2023.01) |
| *H04N 23/23* | (2023.01) |
| *H04N 23/45* | (2023.01) |

(52) U.S. Cl.
CPC .................. *F41G 1/34* (2013.01); *F41G 1/38* (2013.01); *G02B 23/10* (2013.01); *H04N 23/11* (2023.01); *H04N 23/23* (2023.01); *H04N 23/45* (2023.01); *G02B 27/30* (2013.01)

(58) Field of Classification Search
None
See application file for complete search history.

(56) References Cited

U.S. PATENT DOCUMENTS

| | | | | |
|---|---|---|---|---|
| 7,842,921 | B2 * | 11/2010 | Reed | H04N 23/23 |
| | | | | 250/330 |
| 9,897,415 | B2 | 2/2018 | Zhang et al. | |
| 10,012,840 | B2 | 7/2018 | Border et al. | |
| 11,448,881 | B2 | 9/2022 | Browne | |
| 11,473,874 | B2 * | 10/2022 | Masarik | G02B 27/144 |
| 2006/0164718 | A1 | 7/2006 | Tai | |
| 2009/0184889 | A1 | 7/2009 | Kier et al. | |
| 2015/0085133 | A1 | 3/2015 | Teich et al. | |
| 2015/0172545 | A1 | 6/2015 | Szabo et al. | |
| 2016/0156880 | A1 | 6/2016 | Teich et al. | |

(Continued)

*Primary Examiner* — Robert E. Tallman
(74) *Attorney, Agent, or Firm* — Louis S. Horvath

(57) ABSTRACT

A thermal image-forming attachment for a sighting apparatus has a combiner for overlaying a generated thermal image from a display against a visible scene defined along an optical axis of the sighting apparatus, wherein the combiner intersects the optical axis between an objective lens and the visible scene. A first IR camera has a first field of view aligned with the sighting apparatus optical axis; a second IR camera has a second field of view narrower than the first field of view, aligned with the sighting apparatus optical axis. An image processor generates the thermal image on the display, wherein IR image content rendered from the second IR camera is centered within IR image content from the first IR camera. Collimating optics project the thermal image from the display toward the combiner as collimated light aligned with collimated light from the visible scene.

16 Claims, 15 Drawing Sheets

(56)     References Cited

U.S. PATENT DOCUMENTS

| 2018/0096194 | A1 |   | 4/2018 | Glaholt |  |
| 2019/0138089 | A1 |   | 5/2019 | Li et al. |  |
| 2024/0319489 | A1 | * | 9/2024 | Hu | ......................... G02B 13/14 |

* cited by examiner

26

10

36

24

20

L1

"Day" optic
with
combiner

Platform

*Section A-A*

SECTION G-G

IMAGING APPARATUS WITH THERMAL AUGMENTATION

Reference is made to, and priority is claimed from, commonly assigned U.S. Ser. No. 63/449,362, filed as a provisional patent application on 2 Mar. 2023, entitled "IMAGING APPARATUS WITH THERMAL AUGMENTATION" in the name of James Olson, incorporated herein in its entirety.

FIELD OF THE INVENTION

The present application is directed to optical sighting apparatus and more particularly to optical systems that can be worn or carried by an individual viewer for identifying potential targets or threats.

BACKGROUND OF THE INVENTION

There are many situations in which visual location and identification of features of interest in the visible field can be quite difficult due to poor illumination, high smoke or airborne particulate levels, dense foliage, and other objects or conditions. Of particular interest is identification of human or animal subjects within the field of view under such conditions, such as during hunting, tactical, or rescue activity.

To help remedy this difficulty, various types of thermal sensors have been developed and used in the imaging path for providing alternative visible content from the infrared spectrum. A range of sighting apparatus such as weapons scopes, binoculars, goggles, and other types of viewing devices have been provided with infrared (IR) imaging components that allow the viewer to detect and identify human or animal subjects when nighttime or ambient conditions otherwise prevent or obstruct clear vision. Thus, for example, a separate visible channel can be provided in a rifle scope, allowing the hunter or police/military user to employ IR sensing tools to augment visible light imaging.

Although various combinations of visible and thermal IR imaging have been proposed for addressing this difficulty, there are a number of shortcomings that remain. IR imaging can require specialized processing for display, necessitating the use of various image processing hardware and logic components for providing the needed support. In conventional systems, it can be necessary to provide separate packaging to provide either the visible light optics or the IR processed image content, requiring the viewer to change devices, for example, during target identification phases. The generated images from IR sensing are not typically aligned with visible field content; the act of swapping optical devices between thermal sensing and visible light imaging devices can require significant activity on the part of the operator. With many systems, the viewer must mentally coordinate the position of the thermal source (animal or human subject) with unclear visible image content in order to more accurately identify an object in the visible field.

One difficulty that existing optical scope and other sighting optics designs have overlooked relates to the nature of human vision and need for the viewer to be able to clearly perceive and distinguish thermal image content that is foveal, lying along the line of sight defined by the viewer's own vision, without losing the awareness of other human or animal subjects that are more peripheral to the field of view. This difficulty can present particular challenges where an optical scope has magnification that is variable over a range, so that thermal image visibility must accurately correspond to the visible field seen through the scope or other sighting apparatus and must provide sufficient resolution at high magnification.

SUMMARY OF THE INVENTION

It is an object of the present disclosure to address the need for optical sighting apparatus that augment the visible field with high resolution thermal imaging content over a central or foveal portion of the visible field and also provide thermal augmentation outside the foveal region.

With this object in mind, embodiments according to the present disclosure provide a thermal image-forming attachment for a sighting apparatus, the attachment comprising:

(a) a combiner configured for overlaying a generated thermal image from a display against a visible scene defined along an optical axis of the sighting apparatus, wherein the combiner intersects the optical axis between an objective lens of the sighting apparatus and the visible scene;

(b) a first IR camera having a first field of view that is configured for alignment with the sighting apparatus optical axis;

(c) a second IR camera having a second field of view that is narrower than the first field of view, wherein the second camera is configured for alignment with the sighting apparatus optical axis;

(d) an image processor in signal communication with the first and second IR cameras and configured to generate the thermal image on the display, wherein IR image content rendered from the second IR camera is centered within IR image content from the first IR camera; and (e) collimating optics configured to project the thermal image from the display toward the combiner as collimated light aligned with collimated light from the visible scene.

BRIEF DESCRIPTION OF DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
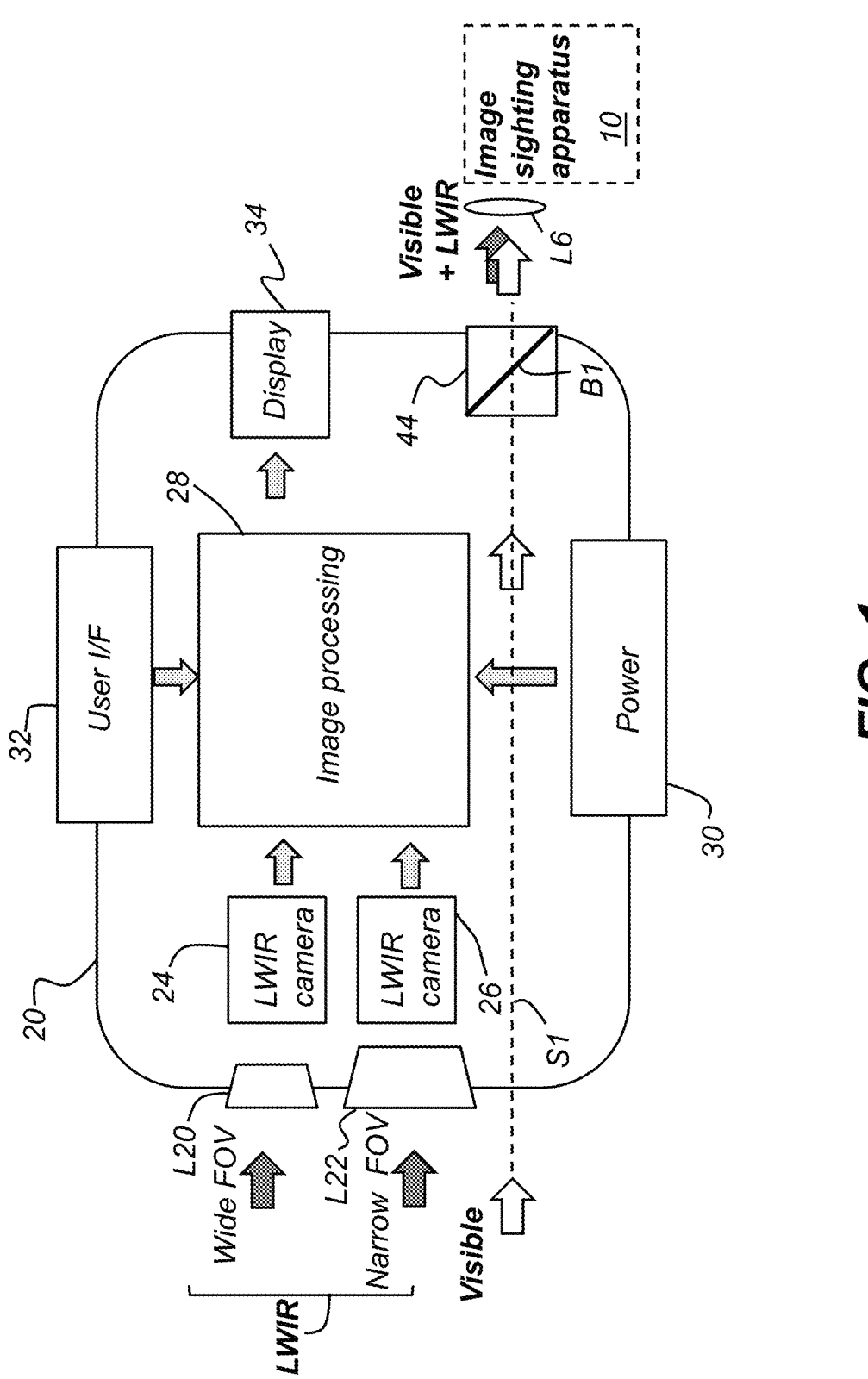
FIG. 1 is a schematic diagram that shows components of a sighting system that provides thermal augmentation to the visible image.

Figures provided herein are given in order to illustrate principles of operation and component relationships along their respective optical paths according to the present invention and may not be drawn with intent to show actual size or scale. Some exaggeration may be necessary in order to emphasize basic structural relationships or principles of operation. Some conventional components that would be needed for implementation of the described embodiments, such as support components used for providing power, for packaging, for interconnection, and for mounting, for example, may not be shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

The terminology "in signal communication" as used in the present application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the term "about" indicates that the value listed can be somewhat altered, as long as the alteration allows a component or assembly to be in reasonable conformance with the process or structure of the illustrated embodiment. The term "exemplary" is not intended to be limiting, but indicates an illustrative example, rather than implying an ideal.

In the context of the present disclosure, the term "sighting system" is used to denote a scope or other sighting apparatus used for a weapon or used with vision-assisting equipment used for improved visibility at long range and in camouflaged, heavy smoke, chemical gas, or other hazardous or obscured environments.

Those practiced in the optical arts consider a beam of light to be "collimated" when the beam is accurately modeled as having parallel rays. As is well known, no light beam can be perfectly collimated; however, in optical design, the concept and use of the term "collimated" is commonly understood, as is the term "collimator" used to describe a corresponding lens or mirror type for maintaining collimation of light. For example, in the understanding of an optical sighting system designer, for an object at "optical infinity", on-axis rays traced to that object, and rays along the axis and substantially parallel to the axis, are considered to be collimated.

In the context of the present disclosure, the phrase "thermal augmentation" relates to techniques that supplement visible field light with generated image content based on IR or thermal array sensing.

In the context of the present disclosure, an optical surface is considered to be substantially transparent if it transmits at least about 50% of incident light or more.

FOV and Foveal Definitions

In conventional use, the term "field of view" (FOV) broadly relates to the overall visible field that is visible to a viewer having relatively normal eyesight, when viewing the visible field using a scope, goggles, or other optical viewing or sighting system that is intended to improve visibility and to aid viewer comprehension of objects within the visible field.

Embodiments of the present disclosure address the problem of obtaining and using thermal imaging content effectively to augment the visible image from the field of view. The visible field is continuously visible to the viewer; the thermal augmentation can be energized or de-energized without requiring removal of the thermal imaging attachment.

FIG. 1 is a schematic diagram showing functional components of a thermal imaging attachment 20 to an image sighting apparatus 10 for providing thermal image enhancement with a variable magnification riflescope or other sighting optical system according to an embodiment of the present disclosure. For reasons described in more detail subsequently, thermal imaging attachment 20 has two cameras 24 and 26, both for capture of long wave infrared (LWIR) light. Each camera 24, 26 provides a thermal image of a portion of the field of view (FOV) of sighting apparatus 10, labeled and described herein as an imaging or sighting system. A first camera 24 obtains a wide FOV (WFOV) image from subjects in the visible field through a lens L20. A second camera 26 obtains a narrow FOV (NFOV) image through a lens L22. A processor 28 executes video processing logic for correlating the thermal image content from the two cameras 24 and 26 and for rendering thermal intensity image content on a display 34, such as an OLED (organic light-emitting diode) or other emissive display surface. The thermal image content is positioned in alignment with the visible scene image through a combiner 44, shown as beam splitter B1 in the FIG. 1 arrangement, that lies along or intersects the optical axis defined by sighting apparatus 10. This allows the thermal image content to "overlay" or visually combine with the visible scene that appears to the viewer through the sighting optics. Combination is performed without "fusion" of image content via digital processing; both the visible scene content and the generated thermal content can be visible, over the full FOV.

Attachment 20 can also have a battery or other power source 30, a user interface 32, and other features, controlled and coordinated through processor 28. Batteries can be replaceable or rechargeable. A USB interface can be provided for battery recharging, for example. The viewer can selectively enable or disable IR image augmentation by use of an on/off switch (not shown) associated with power source 30, or with an enabling signal processed by processor 28.

Figure 2:
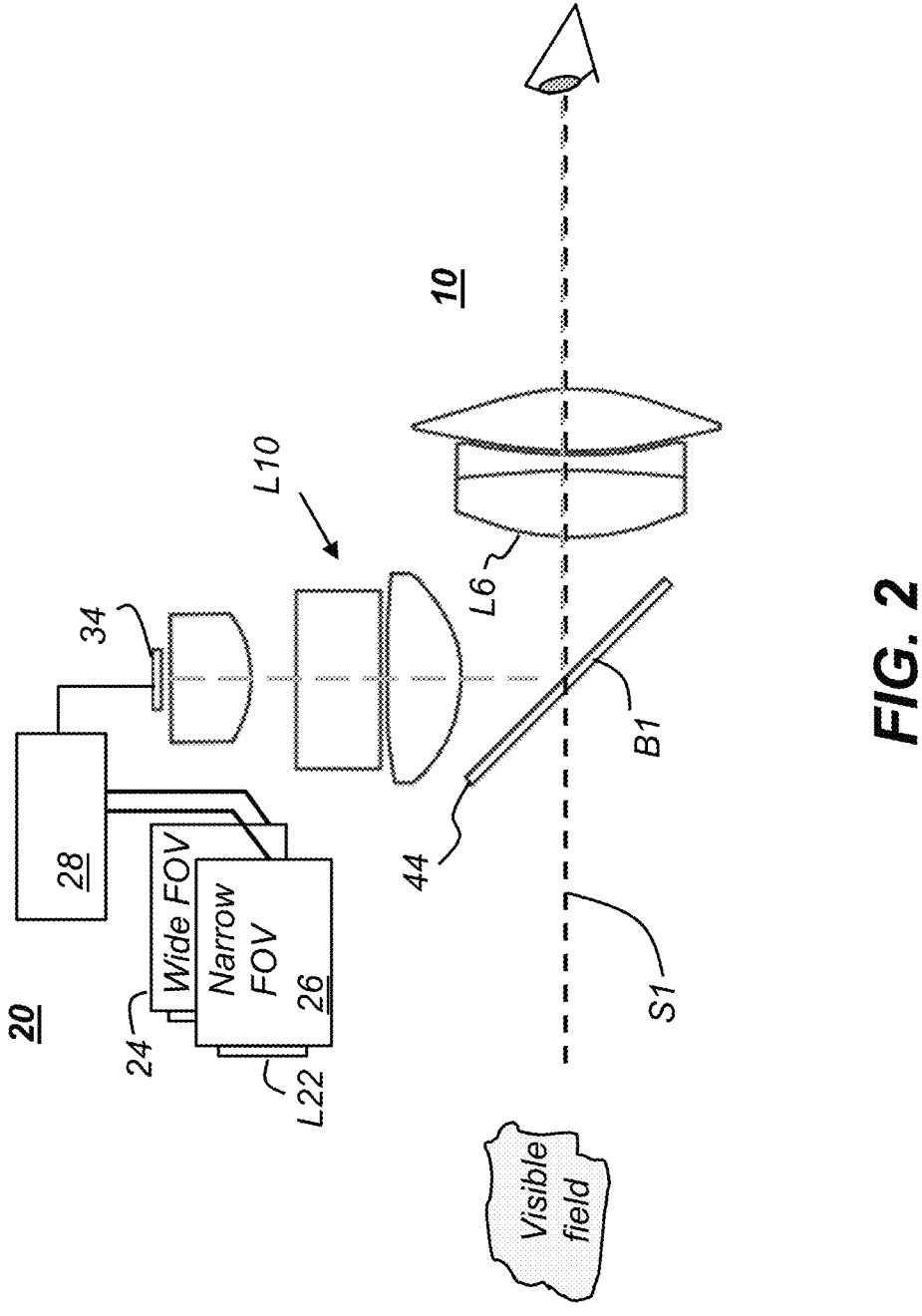
FIG. 2 is a schematic diagram that shows components in the optical paths used for providing thermal augmentation for the visible light image from the image field.

The side-view schematic diagram of FIG. 2 shows attachment 20 integrated with image sighting apparatus 10 components in the optical paths used for providing thermal augmentation for the visible light image from the image field. The visible light path is along a line of sight S1 and through beam splitter B1 or other suitable light-path combiner 44. Line of sight S1 is defined by the optical axis of image sighting apparatus 10. In the thermal imaging light path provided by attachment 20, the thermal image content acquired from cameras 24 and 26 is processed by image processor 28 and digitally combined, one thermal image centered within the other as described in more detail subsequently, to form a composite thermal image that is rendered on display 34. Collimator optics L10 collimate and direct the generated display 34 light that is emitted from display 34 toward beam splitter B1, an exemplary type of combiner 44, where the display content is combined with corresponding image content from the visible field. Beam splitter B1 can be, for example, a 50/50 beam splitter, or other partial beam splitter, appearing substantially transparent to the viewer. Beam splitter B1 is configured to intersect the optical axis between an objective lens L6 of the sighting system and the visible scene. Beam splitter B1 can be a plate or prism beam splitter; alternately, other types of combiner 44 can be used, as described in more detail following. Combiner 44 can be disposed along the line of sight S1 defined by the scope or other sighting optical element of image sighting apparatus 10, and can thus be positioned between the visible field and the sighting optics, as shown in FIG. 2. This arrangement is well-suited where variable magnification is employed and can be favorable for retrofit of attachment 20 to existing sighting optical systems.

Alternately, beam splitter B1 can be a polarization beam splitter, used with corresponding polarization support components for combining and directing the incident light from both the visible field and thermal imaging light paths. Display 34 can emit imaging light of a first polarization that reflects from beam splitter B1. Light of the alternate polarization, from the visible scene along line of sight S1, then transmits through beam splitter B1 and combines at B1 with the generated thermal image-bearing light emitted from display 34.

Figure 3:
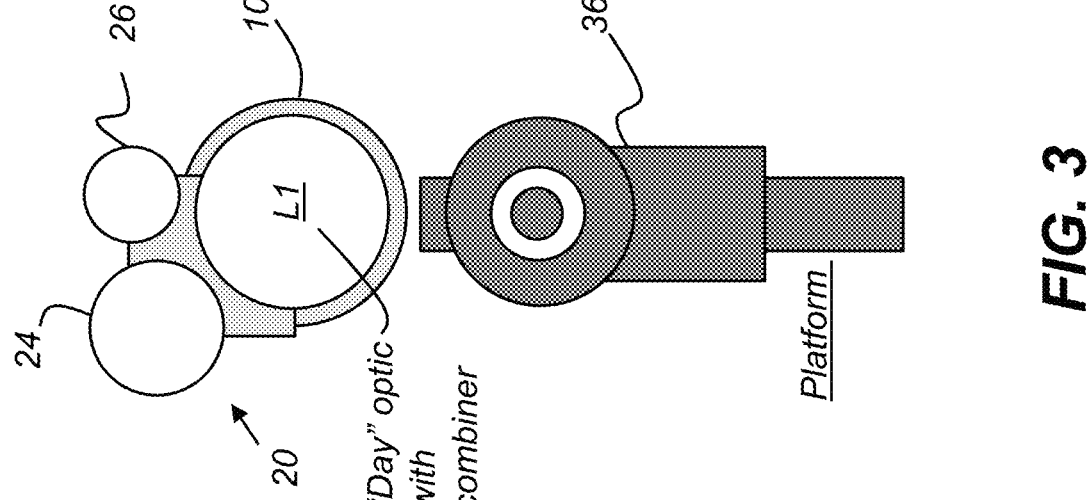
FIG. 3 is a front view of the attachment and optical system of the present disclosure as part of a riflescope device, mounted on a rifle or other platform.

FIG. 3 is a front view of attachment 20 and optical sighting system 10 optics (beam splitter B1 not shown) as part of a riflescope device, mounted on a rifle or other platform 36. Lens L1 represents the "day optic" components (behind the beam splitter B1 in this view) of sighting apparatus 10 for visible light along the line of sight. Lenses 24 and 26, aligned to the line of sight for lens L1, provide the wide- and narrow-FOV thermal image content.

Figure 4A:
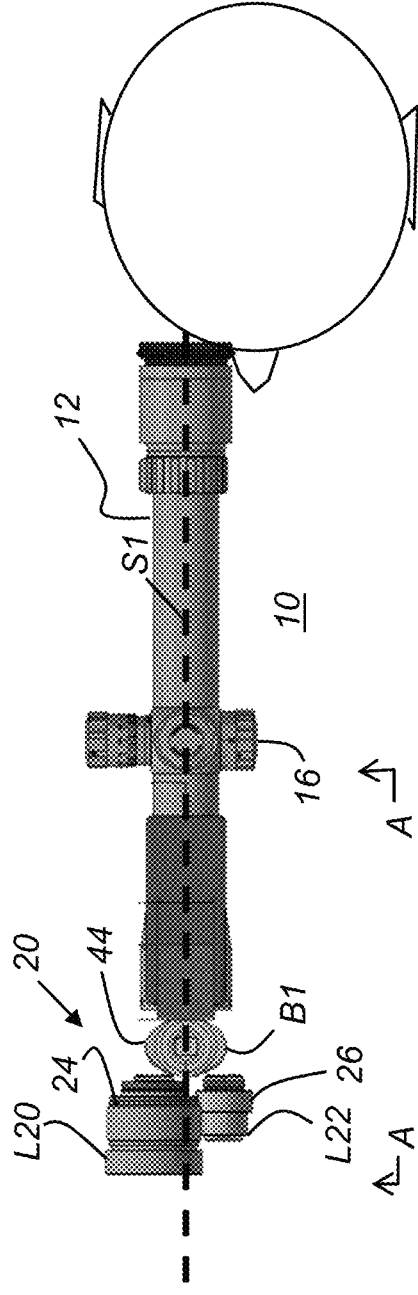
FIGS. 4A and 4B show different views of an optical sighting system that can serve as a variable magnification scope with thermal image augmentation for a rifle or other weapon.
Figure 4B:
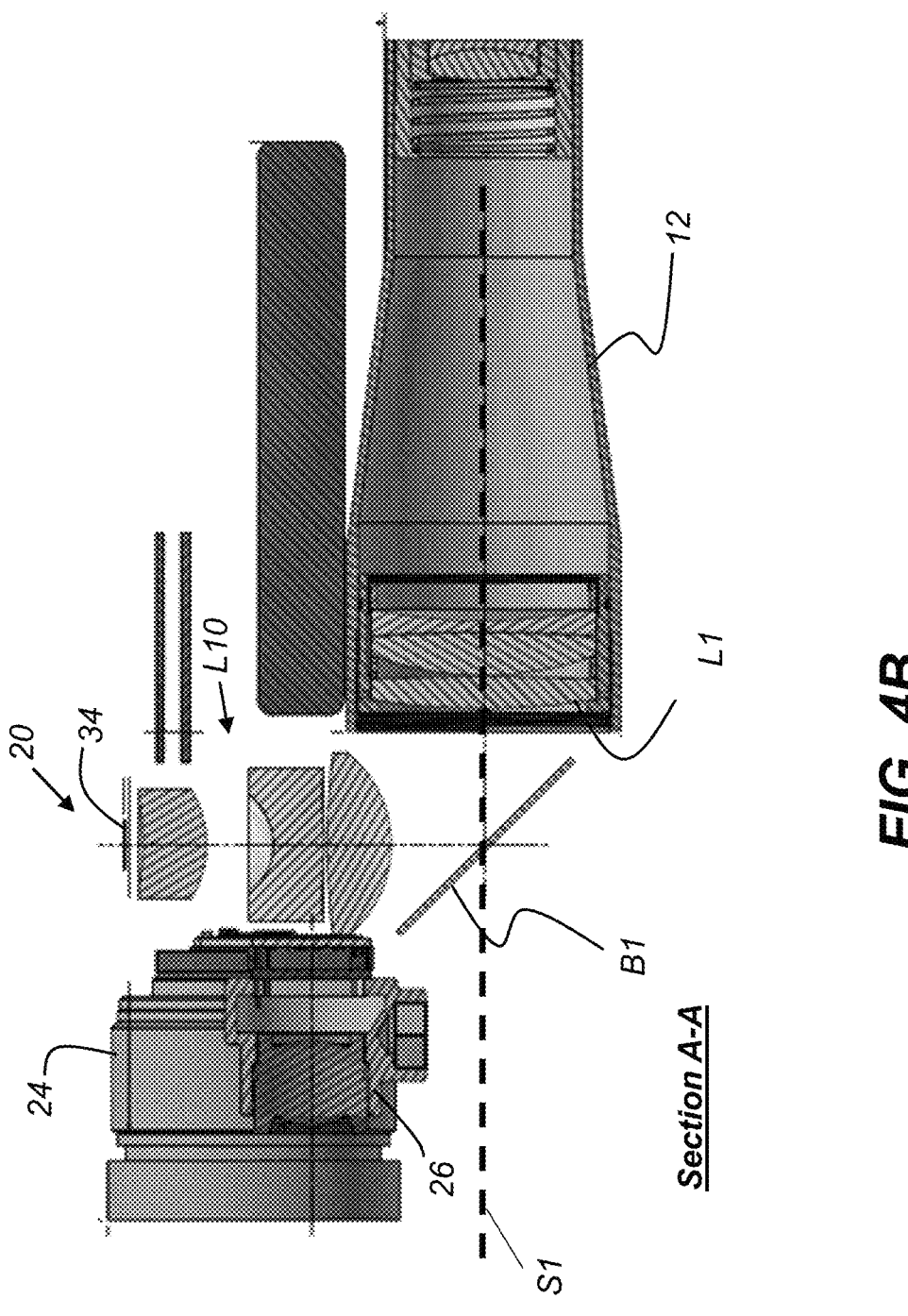
Figure 5:
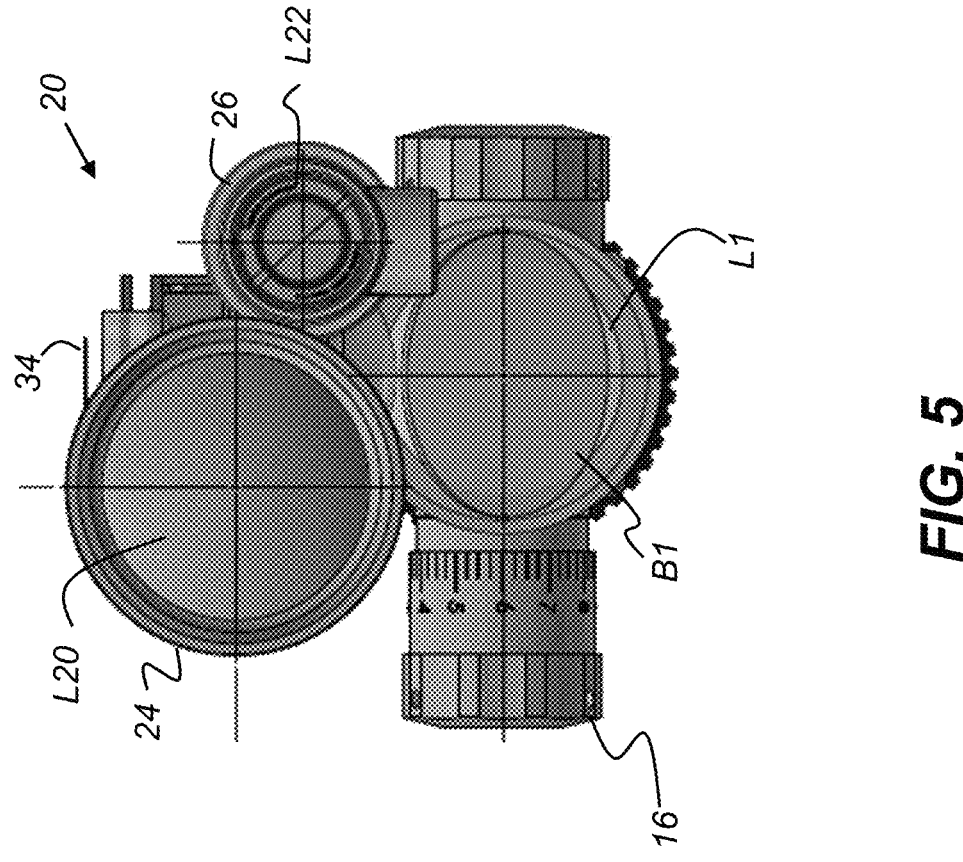
FIG. 5 shows a front view of an optical sighting system that can serve as a variable magnification scope with thermal image augmentation for a rifle or other weapon.

FIGS. 4A, 4B, and 5 show different views of attachment 20 used with an optical image sighting apparatus 10 that can serve as a variable magnification scope with thermal image augmentation for a rifle or other weapon or sighting device. FIG. 4A shows a top view with camera 24,26 and beam splitter B1 components of attachment 20 mounted on a rifle scope 12 as sighting apparatus 10, having variable magnification (mounting apparatus, display 34, and collimator optics not shown for clarity). Viewer line of sight S1, as defined through an eyepiece of scope 12 of the sighting apparatus 10, is indicated in a bold dashed line. Sighting apparatus 10 has thermal imaging attachment 20 with two cameras 24 and 26 that provide supplemental thermal image content along line of sight S1 to augment the visible field as viewed through scope 12. It can be seen that, for scope 12, beam splitter B1 allows visibility of the visible field along line S1; beam splitter B1 is effectively transparent for light from the visible field. In its role as combiner 44, beam splitter B1 also folds line-of-sight S1 to allow combination of the generated thermal image, rendered on display 34 (FIG. 2), with the visible field. Because the rendered display 34 image is conveyed through collimator optics L10, as shown in the partial cross-section view of FIG. 4B, the generated thermal image, viewed through scope 12, appears to be at a comparable optical distance with respect to the visible field seen through beam splitter B1.

Scope 12 in the FIG. 4A-5 configuration can have variable magnification over a range, such as from 1× to 8×, for example. The FOV changes with magnification, as described in detail subsequently. A magnification adjustment knob 16, or other mechanism for magnification adjustment can be provided. Magnification change in sighting apparatus 10 (scope 12) has no effect on the thermal imaging optics of attachment 20.

FIG. 5 shows a front view with attachment 20 components of image sighting apparatus 10. Beam splitter B1 reflects image-bearing light from display 34, acquired by processing the light from camera lenses L21 and L22 for thermal imaging content, and also transmits visible field light along line-of-sight S1 to convey the combined image content through an objective lens L1 for scope 12.

Visible Light Path

According to an embodiment, the visible path optics of image sighting apparatus 10 can provide variable magnification over a range, such as from 1× to 8× magnification. As is well known to those practiced in the optics art, the relative angular dimensions of the FOV vary with the magnification.

Figure 6B:
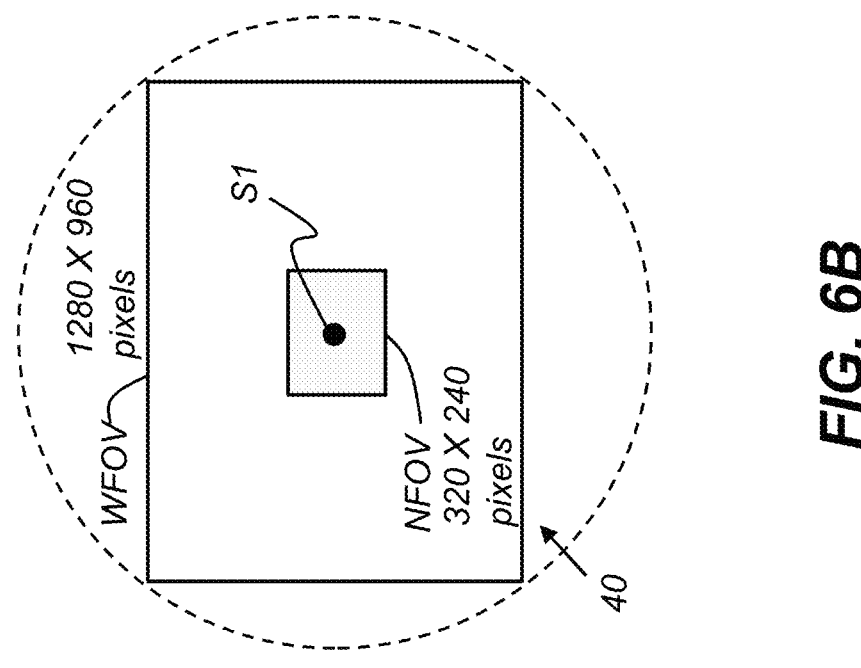
FIG. 6B shows the arrangement of image field contents generated from thermal image sensing according to an embodiment.
Figure 6A:
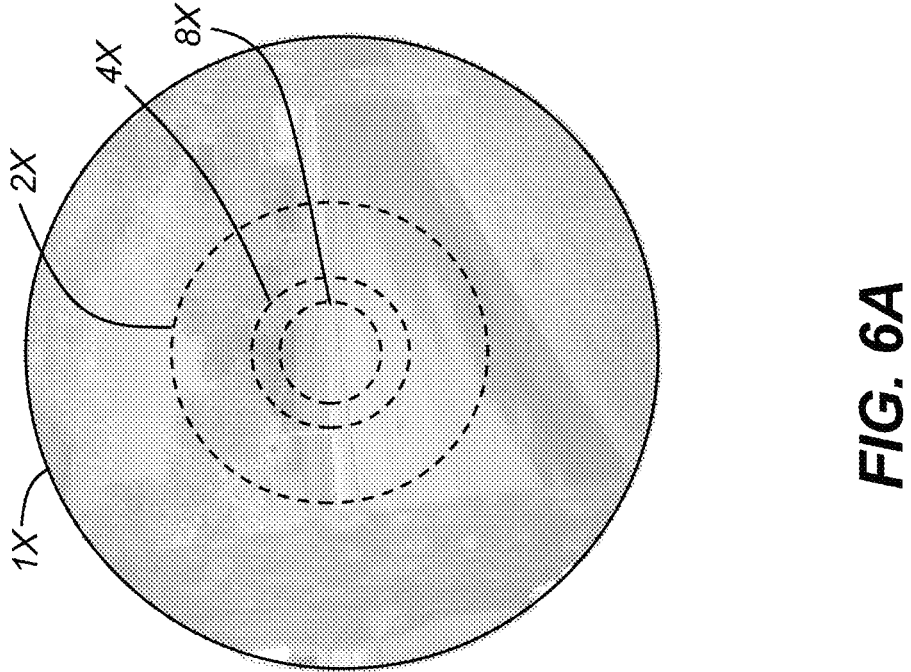
FIG. 6A shows an exemplary FOV representation for a visible scene at 1× magnification.

Referring to FIG. 6A, for example, there is shown an exemplary FOV representation for a visible scene at 1× magnification (nominally 20 degree FOV); at 2× magnification (nominally 10 degree FOV); at 4× magnification (nominally 5 degree FOV); and at 8× magnification (nominally 2.5 degree FOV).

Optionally, the visible light path can include image intensifier (II) components for enhancing the appearance of objects in the visible field under low-light conditions. Image intensifier techniques are well known to those practiced in the night vision arts, for example.

Thermal Imaging Light Path

By comparison with the visible light image path, the FOV of each of the thermal imaging cameras 24 and 26 is fixed, so that the thermal image content that is formed on display 34 and directed to beam splitter B1 can be the same, regardless of scope magnification. As noted earlier with respect to FIG. 1, each camera 24, 26 has a corresponding sensor with an array of pixels. The sensor pixel dimensions can be the same for both cameras 24 and 26, but this is not required. Camera 24 provides a wide-angle FOV (WFOV) that preferably extends to the full width of the visible imaging system provided in scope 12 or other type of image sighting apparatus 10. In the schematic view of FIG. 6B, the size of the visible FOV at full height/width dimensions (1× magnification) is represented by the dashed circle. The composite camera image 40 from display 34 is rectangular, as shown.

As is shown schematically in FIG. 6B, the thermal image content from the two cameras is arranged to form a composite thermal image 40 on display 34, which is rectangular for conventional display components. In the FIG. 6B example, the WFOV thermal imaging content from camera 24 is shown as the rectangular field having width dimensions approximating those of the visible field of scope 12. According to an embodiment of the present disclosure, the first order WFOV camera lens focal length is 13.6 mm. The NFOV thermal imaging content from camera 26 is shown as the smaller rectangle that is rendered within the larger WFOV rectangle and centered about line of sight S1. According to an embodiment of the present disclosure, the first order NFOV camera lens focal length is 55 mm.

As was shown in FIGS. 1 and 2, processor 28 receives the thermal image content from both cameras 24 and 26 and performs the necessary image processing to generate the composite thermal image 40 on display 34, providing the high-definition NFOV region within the larger WFOV image.

The arrangement shown in FIG. 6B provides a significant benefit for thermal augmentation with sighting optical systems. The inner NFOV image presents thermal image content at higher resolution (which can be considered in terms of a higher number of pixels per inch or per mm). The outer WFOV image that surrounds the central, foveal NFOV image is at relatively lower resolution. For the user of a rifle scope 12, for example, this means that thermal image content for objects nearest the central target of the scope 12 system is at high resolution. At the same time, thermal image content for objects outside the foveal or central-target range is visible, but is presented at relatively lower resolution. Using this arrangement, the high resolution image that is nearest line of sight S1 gives the viewer a more accurate image of the target area, augmented with thermal image content, in the foveal region while maintaining viewer awareness of heat-generating objects in surrounding portions of the visible field. Heat-generating objects in the FOV but peripheral to line of sight S1, lying outside boundaries of the defined NFOV region, can be perceived, but are not rendered at high resolution.

For the example of FIG. 6B, the bounding WFOV rectangle can have a width of 1280 pixels, height of 960 pixels; the inner NFOV display can have a width of 320 pixels, height of 240 pixels. In this exemplary embodiment, each camera 24 and 26 can have a sensor with a width of 320 pixels, height of 240 pixels. Thus, the NFOV camera 26 can form an image at its highest possible resolution, wherein each sensor pixel maps 1:1 with a display pixel, forming the NFOV image of 320×240 pixels. For the WFOV image, camera 24 provides image content at 320×240 pixels; the displayed image content, however, extends over 1280×960 pixels (with the central 320×240 pixels in the final image "cut out" or supplanted by the NFOV image). As this exemplary pixel-mapping arrangement shows, the NFOV image content is thus available to the viewer at higher resolution than the WFOV image. In this way, the image nearest the target for a sighting system, the foveal image, is at higher resolution than image on the periphery of the viewer's field of view.

According to an embodiment, a single or base color or color range for thermal image content can be selectable by the viewer, using controls on the user interface 32 (FIG. 1). Thermal image content can be different in color from symbolic or textual content displayed within the scope image, as specified by the viewer. The thermal image content can be a single color or, alternately multiple colors, such as varying in color based on IR intensity.

It should be observed that the optical arrangement just described is well-adapted to physiological aspects of the viewer's vision. For the human eye, the highest relative density of light sensors is in the foveal region, corresponding to the natural line of sight. Sensor density of this central or foveal region is substantially increased over the density of light sensors that acquire light from peripheral or edge regions of the FOV. This design of the human eye allows the viewer to concentrate on visible content over a narrow region of focus without losing awareness of objects that are along the periphery and not along the line of sight.

With respect to the thermal imaging optical path shown in FIG. 2, the image content that is projected, through collimating optics L10 to beam splitter B1, is as shown in FIG. 6B and does not vary with the magnification of the visible scope 12 optics. FIG. 7A shows a mapping that relates the visible field shown in FIG. 6A with the thermal image content shown in FIG. 6B. An exemplary number of magnification levels are shown, for a typical visible scene. Typical boundaries for NFOV and WFOV image content are shown.

Figure 7B:
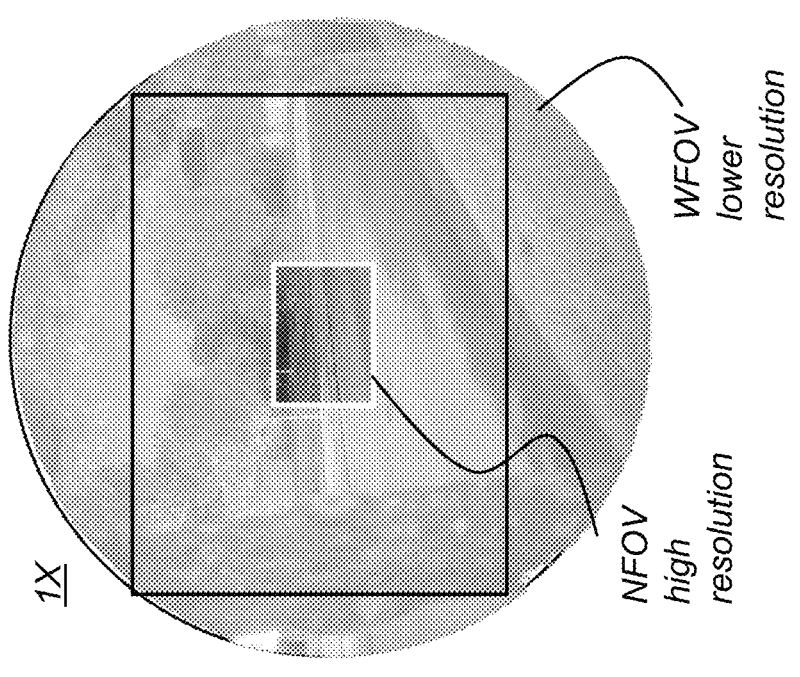
FIG. 7B shows, for the example visible field of FIG. 7A, how the narrower field-of-view (NFOV) fits within a wider field-of-view (WFOV) at low magnification.
Figure 7A:
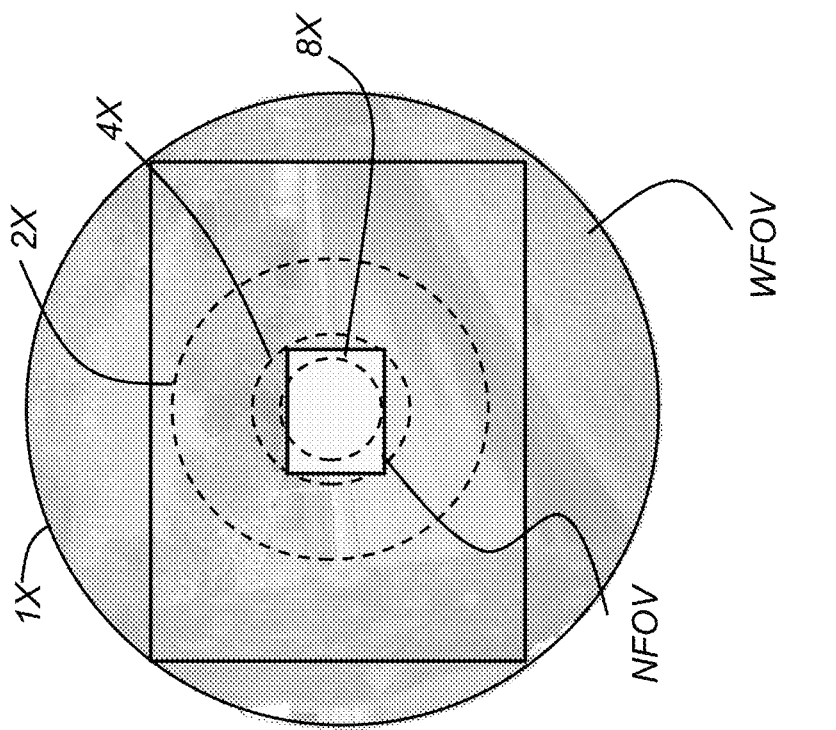
FIG. 7A shows a mapping that relates the visible field shown in FIG. 6A with the thermal image content shown in FIG. 6B.
Figure 7C:
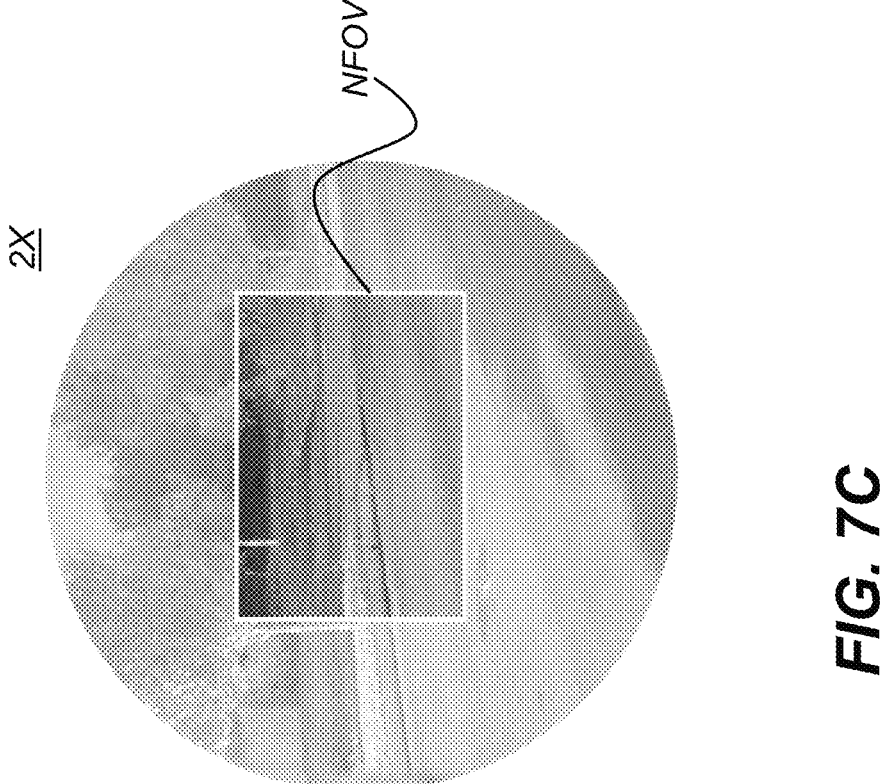
FIG. 7C shows the relatively larger portion of the NFOV region with the visible field at higher magnification.

FIG. 7B shows, for the example visible field of FIG. 7A, how the NFOV content fits within the WFOV with image sighting apparatus 10 at 1× magnification. FIG. 7C then shows the relatively larger portion of the NFOV region with the visible field at 2× magnification. As the mapping of FIG. 7A shows, at 8× magnification, the NFOV region substantially covers the bulk of the visible field. Thus, at 8× magnification in this example, most of the thermal image content that augments the visible field content is at high resolution.

Collimating and Combining Optics

Figure 8:
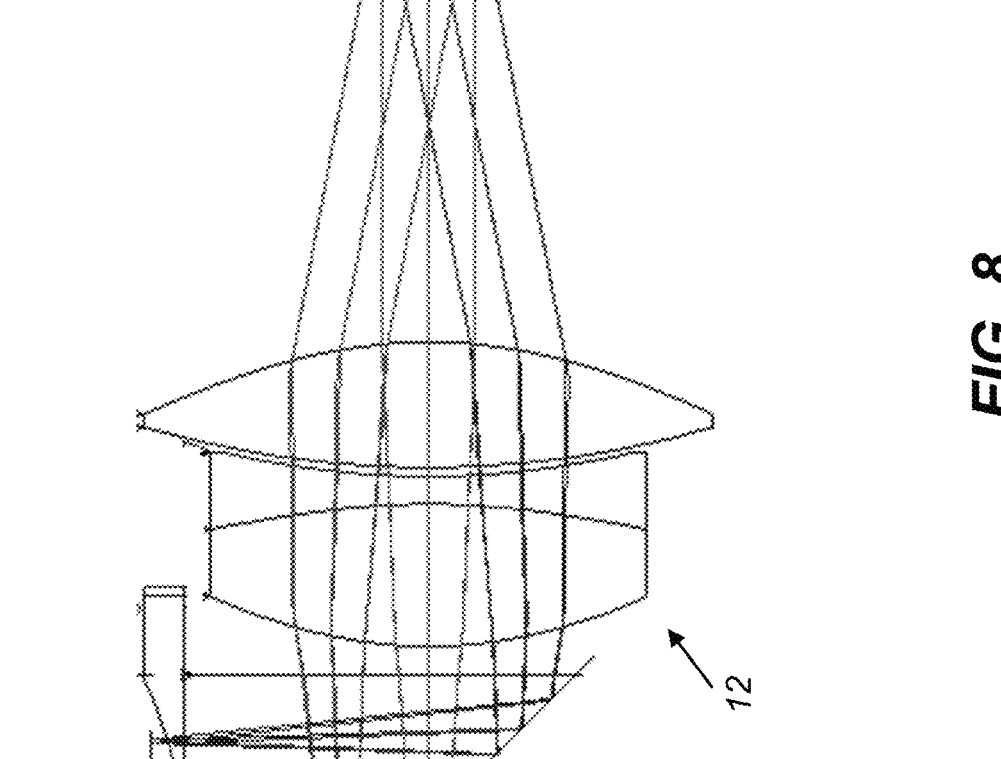
FIG. 8 shows collimation optics used to provide the thermal image to the scope objective lens.

In order to provide thermal image content that can be overlaid against or similarly combined with the visible light image at any magnification in the range of scope 12, an embodiment of the present disclosure provides the light from display 34 as collimated light. The schematic view of FIG. 8 shows the function of collimation optics that can be used to provide the thermal image to the objective lens of scope 12 or other image sighting apparatus 10. The emitted light from display 34 is provided sufficient collimation to allow combination with the visible field and maintain acceptable appearance, so that overlaid thermal image content appears in good focus.

Figure 9:
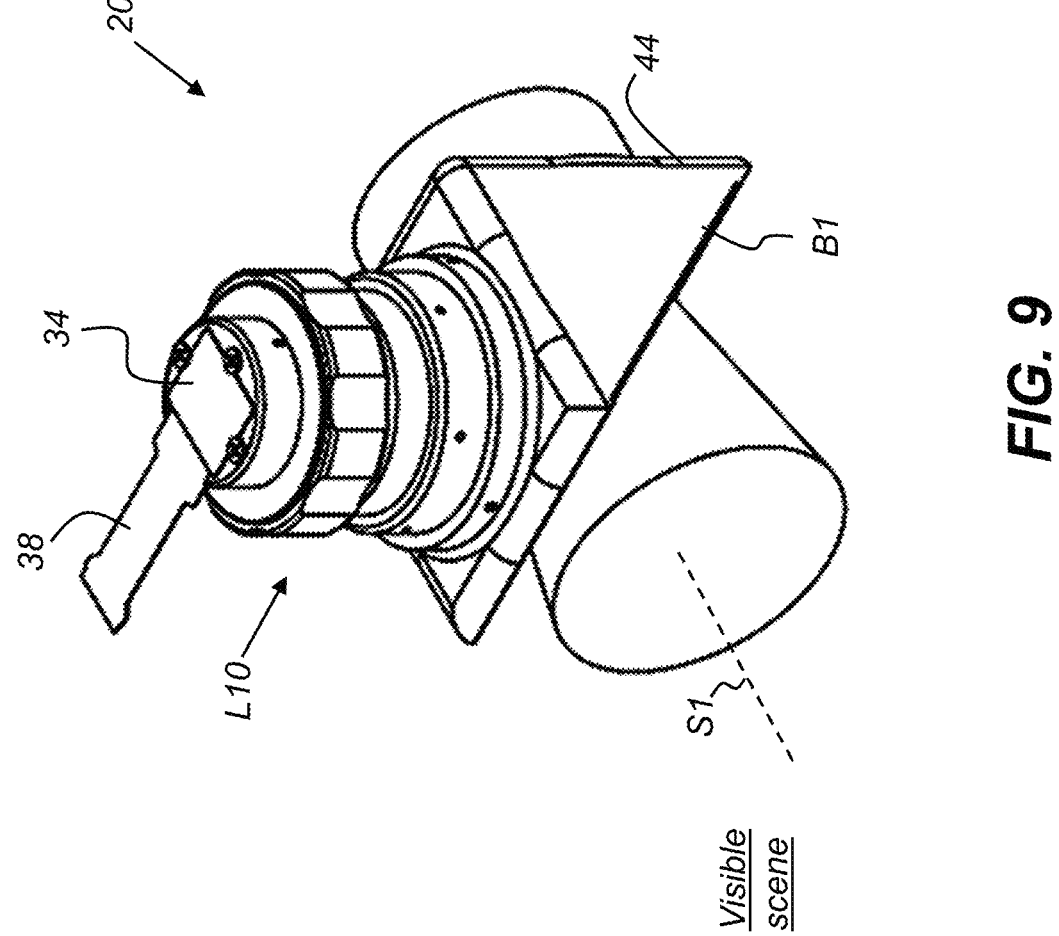
FIG. 9 shows the thermal imaging attachment in perspective view.

FIG. 9 shows a perspective view of thermal image generation portions of thermal attachment 20, with display 34 and its supporting cable 38 for power and signal content. Collimating optics L10 conveys the light emitted from display 34 for reflection that redirects this light onto line-of-sight S1.

Figure 10:
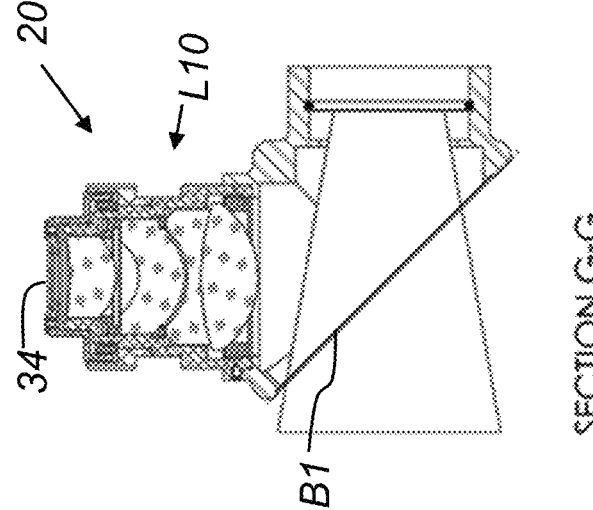
FIG. 10 shows front and side sectioned views of the thermal imaging attachment.
Figure 10:
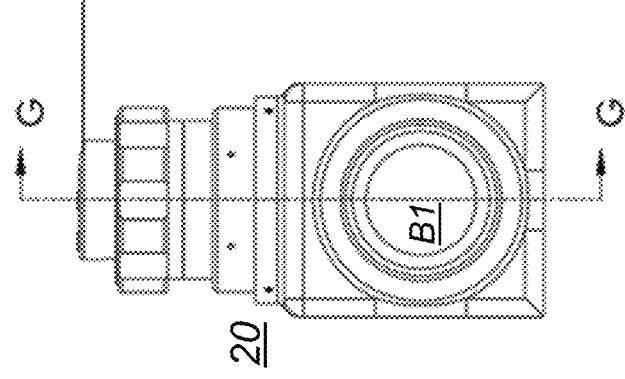

FIG. 10 shows front and side-sectioned views of thermal imaging attachment 20 according to an embodiment.

Alignment of Optical Systems

In order to provide IR image content that augments the visible image of the scope or other viewing system 12, cameras 24 and 26 are mounted so that they can be aligned to each other and to the optics of scope 12 or other image sighting apparatus 10. According to an embodiment of the present disclosure, a coarse mechanical alignment is initially provided by the camera mount hardware, such as by maintaining careful assembly tolerances in manufacture, for example. Once at least coarse alignment is achieved, image processing at processor 28 (FIG. 1) can be used for digital alignment, to further align image content or to otherwise correct alignment between the two cameras more precisely.

Alternative Combiner Designs

Figure 11C:
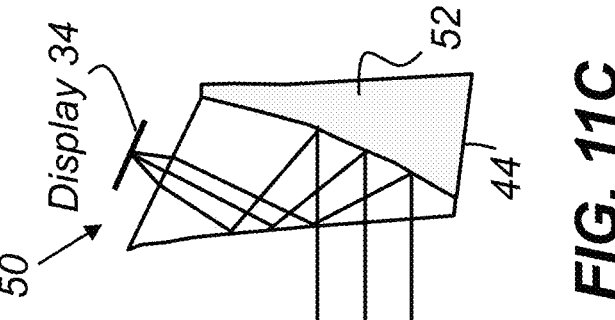
FIG. 11C is a schematic diagram that shows an alternate free-form prism configuration.

According to an alternate embodiment of the present disclosure, combiner 44 design can take advantage of free-form optics, including optics formed using any of a number of optical polymers. FIG. 11A is a schematic diagram that shows the use of a reflective surface 46 with a double-sided free-form surface 48 that allows both transmission and reflection for image combination and viewing.

Figure 11B:
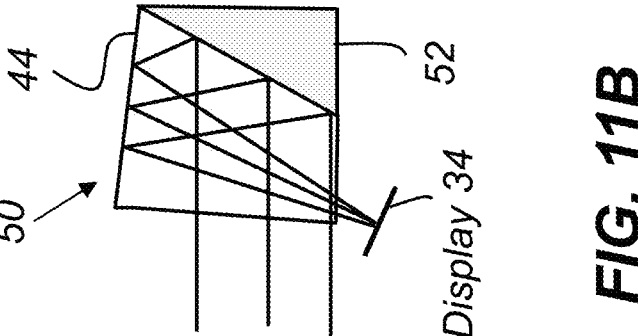
FIG. 11B is a schematic diagram that shows use of a free-form prism for use as a combiner.
Figure 11A:
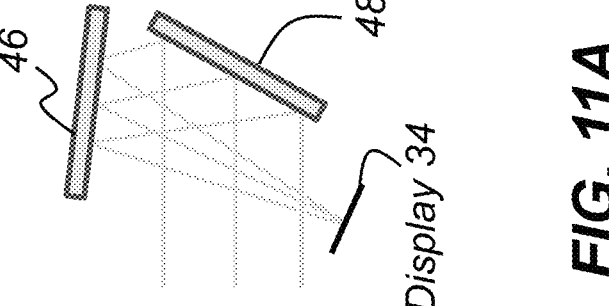
FIG. 11A is a schematic diagram that shows the use of free-form optics according to an embodiment of the present disclosure.

FIG. 11B is a schematic diagram that shows a free-form prism 50 for use as combiner 44. A compensator prism 52 is used to correct for see-through behavior. FIG. 11C is a schematic diagram that shows an alternate free-form prism 50 with compensator prism 52.

Thermal Overlay and Outline

Figure 12A:
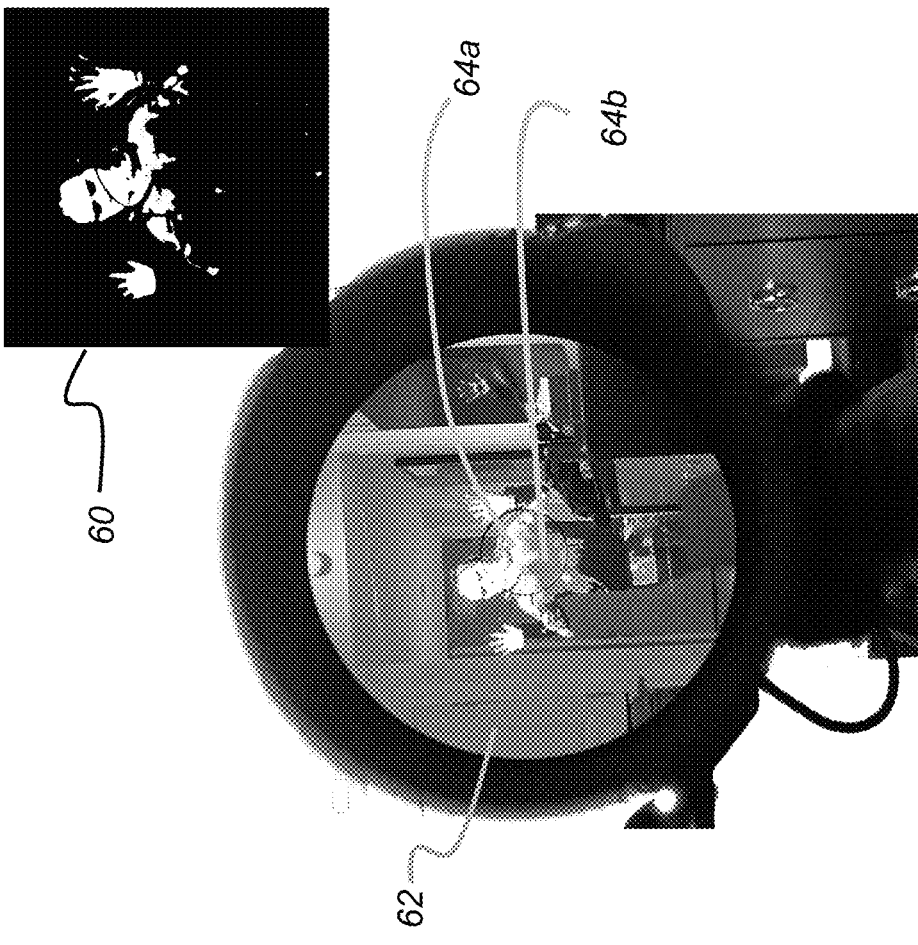
FIG. 12A is a view showing a composite image as viewed through a scope that is equipped with the attachment of the present disclosure.

The thermal image that can be generated from cameras 24, 26 can also be processed to improve various aspects of sighting apparatus performance. FIG. 12A shows a composite image 62, as it would be viewed through a scope 12 or other image sighting apparatus 10 that is equipped with attachment 20 of the present disclosure. A separate window in FIG. 12A shows a rendered display 60 corresponding to the composite image 62 shown. That is, composite image 62 is formed as a combination of the visible scene through the scope 12 optics and display 60, also seen through scope 12 optics.

Digital processing using processor 28 (FIG. 1) allows presentation of the thermal imaging content in a number of ways. For example, as indicated in FIG. 12A, different colors 64a, 64b can be provided for the thermal content. This can include not only a selection of colors, but presentation of the processed thermal data using color to represent different heat levels, for example.

Figure 12B:
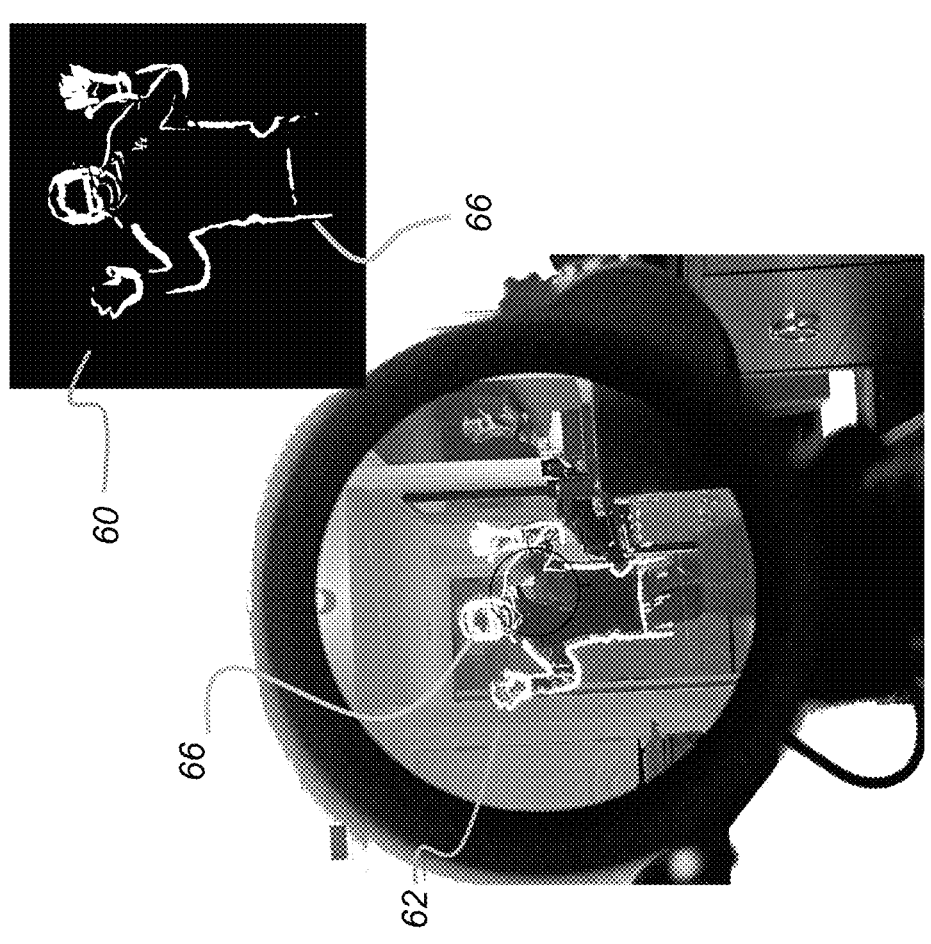
FIG. 12B is a view showing a composite image as viewed through a scope that is equipped with the attachment of the present disclosure, wherein the thermal image content provides an outline of a thermal subject.

The thermal image content can also be processed using image processing utilities that perform edge detection. For example, FIG. 12B shows edge detection applied to display 60 to generate an outline 66. When combined into composite image 62, the edge-detection data provides an outline of a thermal subject, such as a person or animal that serves as the object of the optical system, for example; a living mammal is a thermal source with respect to the thermal detection of cameras 24, 26. This type of generated outline 66 can help to more positively identify the subject shown in the scope 12. Because the thermal image content from IR cameras 24, 26 is continually in alignment with the visible scene content of image sighting apparatus 10, the thermal outline 66 accurately tracks the shape of a living subject in the visible field, either moving or stationary. Edge detection techniques for generating an outline (such as Sobel edge detection) are familiar to those skilled in the image processing arts.

Advantageously, the component arrangement of the present disclosure allows the viewer to selectively enable or disable IR image augmentation as desired, without requiring removal of thermal imaging attachment 20. By using beam splitter B1 as combiner for the visible field and generated thermal image content, the visible field can be continuously visible to the viewer, whether the thermal image cameras are powered ON or turned OFF.

Embodiments of a sighting system having thermal image augmentation, such as a weapon sight system or firearm scope described herein, can allow a viewer to selectively enable or disable thermal image augmentation as desired. The viewer can also enable or disable image intensification for embodiments where II operation is provided.

The thermal augmentation optics can be mounted on the scope itself that provides the visible image, or mounted on some other component. In various embodiments, the sighting apparatus can support a firearm, such as a rifle, a shotgun, a machine gun, or the like. In some cases, a weapon system may be a non-firearm weapon, such as a bow, dart gun, or other projectile-based weapon.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A thermal image-forming attachment for a sighting apparatus, the attachment comprising:

(a) a combiner configured for overlaying a generated thermal image from a display against a visible scene defined along an optical axis of the sighting apparatus, wherein the combiner intersects the optical axis between an objective lens of the sighting apparatus and the visible scene;

(b) a first IR camera having a first field of view that is configured for alignment with the sighting apparatus optical axis;

(c) a second IR camera having a second field of view that is narrower than the first field of view, wherein the second camera is configured for alignment with the sighting apparatus optical axis;

(d) an image processor in signal communication with the first and second IR cameras and configured to generate the thermal image on the display, wherein IR image content rendered from the second IR camera is centered within IR image content from the first IR camera; and (e) collimating optics configured to project the thermal image from the display toward the combiner as collimated light aligned with collimated light from the visible scene.

2. The attachment of claim 1 wherein the sighting apparatus has variable magnification for both the visible scene and for the generated thermal image at the combiner.

3. The attachment of claim 1 wherein the first and second IR cameras are configured to acquire thermal image content over substantially the same wavelength range.

4. The attachment of claim 1 wherein the IR image content from the second IR camera has higher resolution than the IR image content from the first IR camera.

5. The attachment of claim 1 further comprising a user interface control that is configured to allow viewer selection of a display color for the IR image content in the thermal image.

6. The attachment of claim 1 wherein the attachment further comprises a rechargeable power source.

7. The attachment of claim 1 wherein the combiner is a beam splitter prism.

8. The attachment of claim 1 wherein the combiner is a beam splitter plate.

9. The attachment of claim 1 wherein the combiner is a polarization beam splitter.

10. The attachment of claim 1 wherein the sighting apparatus is a rifle scope.

11. The attachment of claim 1 wherein the image processor renders the IR image content as an outline of a subject viewed through the sighting apparatus.

12. An optical apparatus comprising:
(a) sighting optics that define a line of sight along an optical axis extending from a visible scene to a viewer eyepiece;
(b) a thermal image generation apparatus coupled to the sighting optics and comprising:
  (i) a first IR camera having a first field of view that is aligned with the optical axis;
  (ii) a second IR camera having a second field of view that is narrower than the first field of view and is also aligned with the optical axis;
  (iii) an image processor in signal communication with the first and second IR cameras and configured to form a composite thermal image on an emissive display, wherein the composite thermal image renders IR image content from the second IR camera, at a second resolution, centered within IR image content that is at a first resolution from the first IR camera, wherein the first resolution is lower than the second resolution;
  (iv) collimating optics configured to project the composite thermal image from the emissive display as collimated light;
and
(c) a beam splitter disposed to redirect the composite thermal image onto the optical axis to augment light from the visible scene.

13. The optical apparatus of claim 12 wherein the combiner is formed as a free-form optical prism.

14. A method comprising:
(a) coupling a thermal image generation apparatus to a sighting apparatus that defines a line of sight along an optical axis that extends from a visible scene, through an objective lens, and to a viewer eyepiece;
(b) aligning, to the optical axis, a first IR camera having a first field of view along the optical axis and a second IR camera having a second field of view along the optical axis, wherein the second field of view is narrower than the first field of view;
(c) processing thermal image content from the first and second IR cameras and generating a composite display image having the image content from the second IR camera positioned within the image content from the first IR camera;
(d) rendering the composite display image on an emissive display; and
(e) conveying light from the emissive display, as collimated light, to a combiner that is disposed along the optical axis between the visible scene and the objective lens of the sighting apparatus.

15. The method of claim 14 wherein the image content from the second IR camera is visible through the viewer eyepiece over a range of sighting apparatus magnification settings.

16. The method of claim 14 further comprising digitally tuning the alignment of one or more of the first and second IR cameras at the processor.

\* \* \* \* \*